(12) United States Patent
Johnson

(10) Patent No.: US 6,416,240 B1
(45) Date of Patent: Jul. 9, 2002

(54) APERTURE AND LENS MECHANISM

(75) Inventor: Glenn W. Johnson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 36 days.

(21) Appl. No.: 09/651,618

(22) Filed: Aug. 30, 2000

(51) Int. Cl.$^7$ ................................................ G02B 9/00
(52) U.S. Cl. ........................ 396/505; 396/459; 359/739
(58) Field of Search .................. 396/505, 506, 396/507, 508, 509, 510, 459, 449, 89; 359/701, 739; 348/362, 363

(56) References Cited

U.S. PATENT DOCUMENTS

| | | | |
|---|---|---|---|
| 3,883,244 A | | 5/1975 | Whitaker et al. |
| 3,906,529 A | * | 9/1975 | Filipovich ..................... 396/89 |
| 4,159,165 A | * | 6/1979 | Betensky et al. ........... 359/661 |
| 4,273,414 A | | 6/1981 | Shimojima |
| 4,865,433 A | * | 9/1989 | Okajima et al. ............... 396/89 |
| 5,237,357 A | | 8/1993 | Morisawa |
| 6,086,267 A | * | 7/2000 | Tsuzuki et al. ............. 396/459 |

* cited by examiner

Primary Examiner—Alan A. Mathews
(74) Attorney, Agent, or Firm—Thomas H. Close

(57) ABSTRACT

An aperture and lens mechanism for a camera, includes a rotatably mounted lens barrel supporting a lens and moveable in a direction parallel to the optical axis of the lens in response to rotation; an aperture support mounted for movement parallel to the optical axis of the lens and spring biased into contact with the lens barrel for movement therewith; and an aperture blade defining an aperture, the aperture blade being mounted on the aperture support for movement between a first position where the aperture is centered on the optical axis of the lens and a second position away from the optical axis of the lens.

3 Claims, 3 Drawing Sheets

APERTURE AND LENS MECHANISM

FIELD OF THE INVENTION

The present invention relates generally to aperture and lens mechanisms for cameras, and more particularly to such mechanisms wherein the lens can be rotated to focus and the aperture can be varied.

BACKGROUND OF THE INVENTION

Many cameras have an aperture system that provides a method of controlling the amount of light that hits the light sensitive device (film, CCD, etc.). In most simple optical systems, this aperture should be a fixed distance from the lens. If the lens is moved relative to the aperture plane, then some optical degradation occurs (loss of resolution). Typically, the aperture is on a blade that rotates or translates into the path of the optical system. The plane of aperture blade is usually in a fixed plane relative to the rest of the camera and the lens system moves closer or farther away from this plane as the lens is focused. In most camera systems, this motion of the lens relative to the aperture plane is very small and an insignificant amount of optical degradation occurs. However, if the distance variation between the lens and the aperture plane becomes too large, the optical degradation can be significant. For example, in some cameras, there is a desire to have a very close focus distance such as 2 inches. For a lens with a focal length of 6.2 mm, the lens must translate approximately .86 mm relative to the sensor to achieve a focus range of 2 inches to infinity. If the aperture is in a fixed plane, then the lens to aperture distance variation will be 0.86 mm. This amount of lens to aperture variation can result in a significant optical degradation (loss of resolution).

As a lens in a camera system moves relative to the image plane in order to achieve focus it typically is also rotating (on a set of three ramps or on a threaded interface). If an aperture were to move with the lens for the reasons described above, then it too would be rotating. This can be a problem if the means for selecting the aperture is to be done manually since the aperture select button (mechanical user interface button) needs to be in a fixed position relative to the product whereas the aperture blade is rotating relative to the product.

Accordingly, a need continues to exist for an aperture and lens mechanism that avoids these problems.

SUMMARY OF THE INVENTION

The need is met according to the invention, by providing an aperture and lens mechanism for a camera, that includes a rotatably mounted lens barrel supporting a lens and moveable in a direction parallel to the optical axis of the lens in response to rotation; an aperture support mounted for movement parallel to the optical axis of the lens and spring biased into contact with the lens barrel for movement therewith; and an aperture blade defining an aperture, the aperture blade being mounted on the aperture support for movement between a first position where the aperture is centered on the optical axis of the lens and a second position away from the optical axis of the lens.

ADVANTAGEOUS EFFECTS OF THE INVENTION

The aperture and lens mechanism of the present invention has the advantage that the aperture stays in relative position to the lens to minimize optical degradation which can occur if focus extremes are great. Another advantage of this concept is that the location of the aperture can be located more accurately to the lens (centerline of aperture to optical axis). This is important because the greater the distance between the centerline of the aperture and the optical axis, the greater the degradation of the optical system. If the lens does not directly locate the aperture plate, then there is a greater tolerance build-up that can adversely affect the lens to aperture alignment and therefore the optical performance.

DETAILED DESCRIPTION OF THE INVENTION

Figure 1:
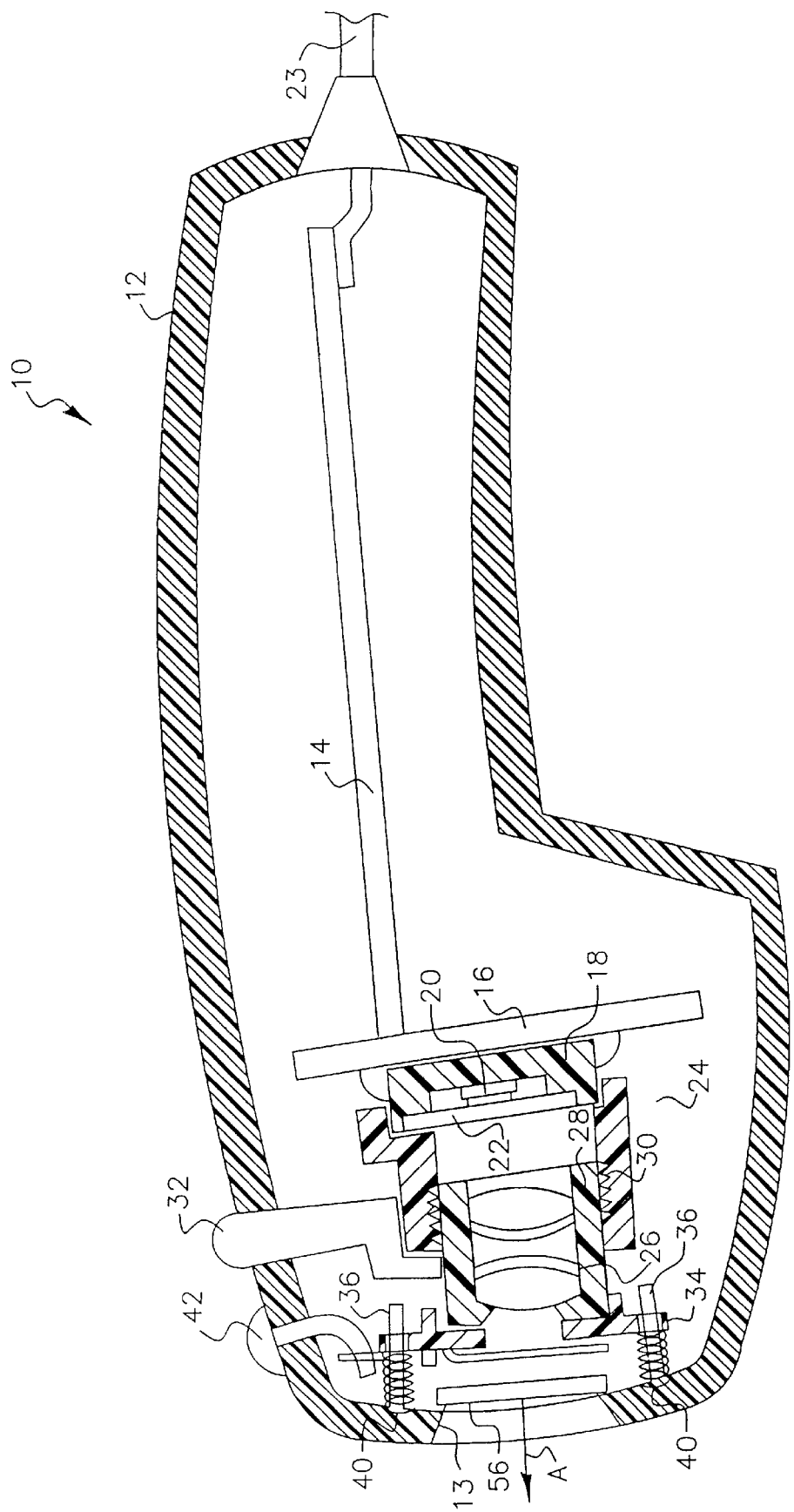
FIG. 1 is a cross sectional view of a camera having an aperture and lens mechanism according to the present invention.

Referring to FIG. 1, a cross sectional view of an electronic camera, generally designated 10, having an aperture and lens mechanism according to the present invention is shown. The camera 10 includes a camera body 12, which includes an opening 13 and in which are mounted a pair of circuit boards 14 and 16. An image sensor assembly 18 is mounted on circuit board 16. The image sensor assembly 18 includes an image sensor 20, such as a CCD image sensor, and a transparent window 22. The camera is of the type that is tethered to a personal computer (not shown), and includes a line 23 for receiving power and for delivering an image signal to the computer.

An optics mounting structure 24 is fixed to the image sensor assembly 18. The aperture and lens mechanism according to the present invention includes a lens assembly 26 mounted in a lens barrel 28. The lens barrel 28 is rotatably mounted in the optics mounting structure 24 and is urged in the direction of arrow A upon rotation by threads 30 or cams (not shown) on the lens barrel, and cooperating structure (threads or cam surface) on the optics mounting structure 24. A focus lever 32 is attached to lens barrel 28 and can be moved by a camera operator to rotate lens barrel 28. During this rotation, the lens barrel 28 translates in the direction of arrow A relative to the image sensor 20 to focus a scene on the image sensor.

Figure 2:
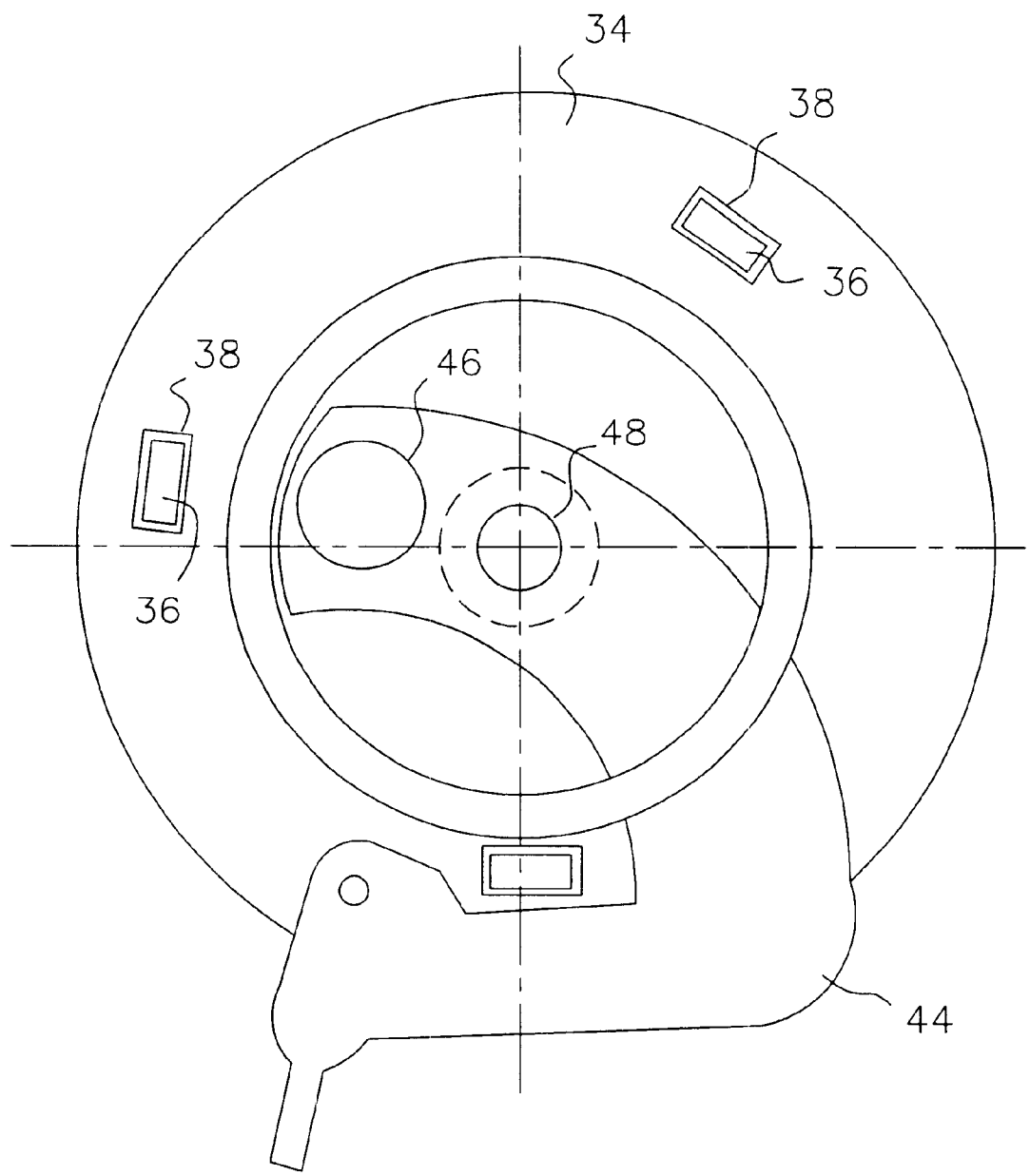
FIG. 2 is a plane view of the aperture support shown in FIG. 1.

An aperture mechanism plate 34 is slidably mounted on the inside of the front face of the camera body 12 by tabs 36. Referring to FIG. 2, the aperture mechanism plate 34 has three slots 38 that receive the tabs 36. The aperture mechanism plate 34 is urged by a spring or springs 40 against the lens barrel 28 so that as the lens barrel 28 translates, the aperture mechanism plate 34 follows it. The spring 40 also provides a force to urge the threads or cam on lens barrel 28 into the cooperating structure (threads or cam surface) on the optics mounting structure 24 to eliminate any lash between the lens barrel and the optics mounting structure. The three tabs 36 on the front of the camera housing prevent the aperture mechanism plate 34 from rotating with the lens barrel 28. Instead, the aperture mechanism plate 34 will translate along these tabs in the direction of arrow A as the lens barrel 28 is rotated. Since the aperture mechanism plate 34 does not rotate relative to the camera body 12, the interface with an aperture select button 42 becomes fairly simple. An aperture blade 44 having one or more apertures 46, 48 is pivotally mounted on the aperture mechanism plate 34 (see FIG. 2).

Figure 3:
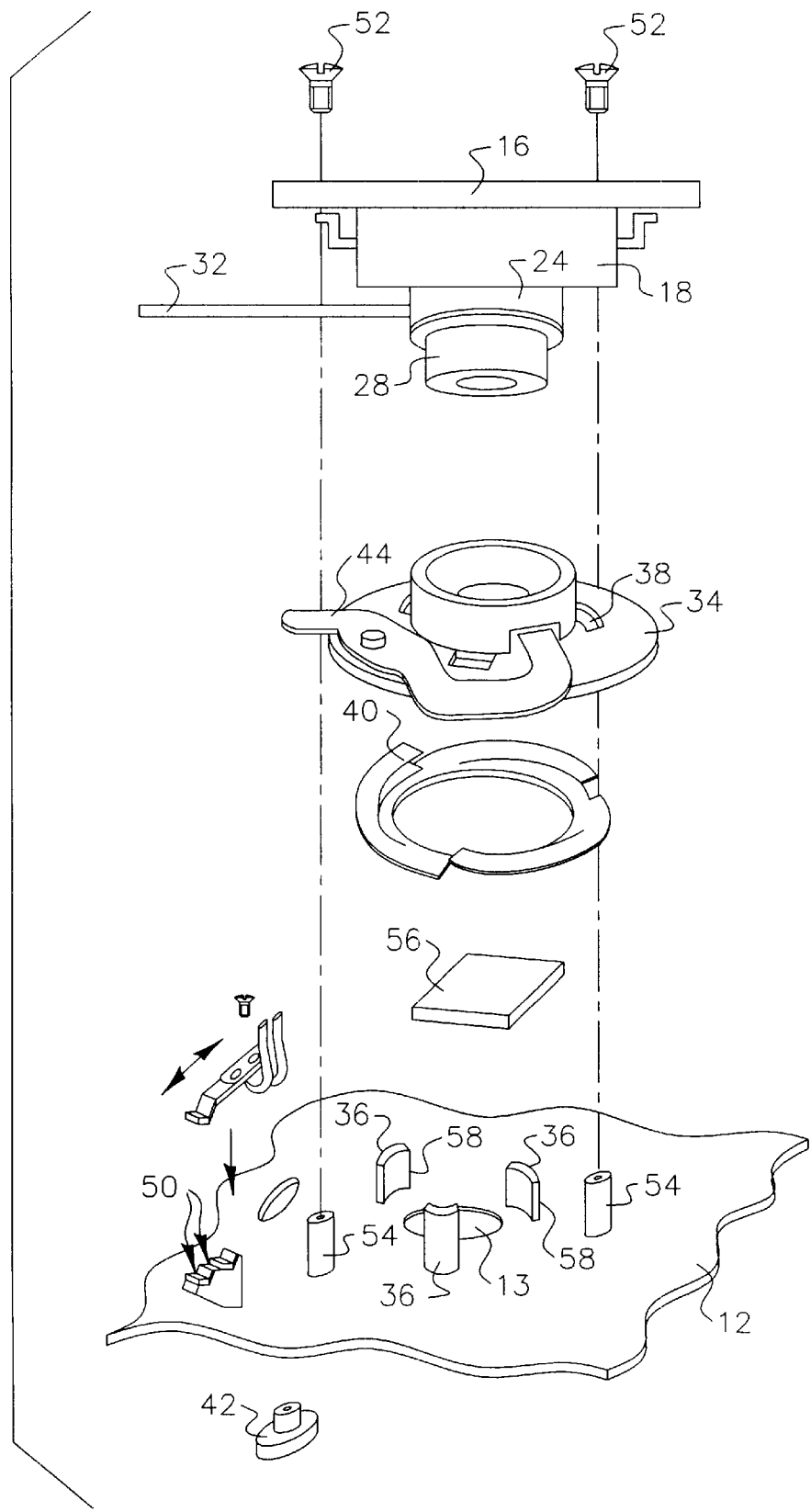
FIG. 3 is an exploded perspective view of the aperture and lens mechanism according to the present invention.

Referring to FIG. 3, the aperture and lens mechanism of the present invention is shown in exploded perspective. The aperture blade 44 can be pivoted to position one of the apertures over the lens barrel 28 by moving aperture select button 42. Aperture select button 42 is retained at the different aperture positions by detents 50. As shown in FIG. 3, the circuit board 16 is fastened to the front of the camera body by screws 52 that screw into posts 54. Posts 54 locate the circuit board 16 a fixed distance from the front of the camera body 12. A transparent window 56 can optionally be provided over opening 13 to keep dirt out of the camera. As shown in FIG. 3, the spring 40 can be of flat washer construction. Also, as shown in FIG. 3, the tabs 36 are provided with latching teeth 58 that engage the edges of slots 38 in aperture mechanism plate 34 to hold the aperture mechanism plate in position against the force of spring 40 during assembly.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 camera
12 camera body
13 opening
14 circuit board
16 circuit board
18 image sensor assembly
20 image sensor
22 transparent window
23 line (for receiving power)
24 optics mounting structure
26 lens assembly
28 lens barrel
30 threads
32 focus lever
34 aperture mechanism plate
36 tabs
38 slots
40 springs
42 aperture select button
44 aperture blade
46 aperture
48 aperture
50 detents
52 screws
54 posts
56 transparent window
58 latching teeth

What is claimed is:

1. An aperture and lens mechanism for a camera, comprising:
    a) a rotatably mounted lens barrel supporting a lens and moveable in a direction parallel to the optical axis of the lens in response to rotation;
    b) an aperture support mounted for movement parallel to the optical axis of the lens and spring biased into contact with the lens barrel for movement therewith; and
    c) an aperture blade defining an aperture, the aperture blade being mounted on the aperture support for movement between a first position where the aperture is centered on the optical axis of the lens and a second position away from the optical axis of the lens.

2. The aperture and lens mechanism claimed in claim 1, further comprising a camera cover defining a lens opening and having a plurality of ribs extending from the cover in a direction parallel to the optical axis of the lens and wherein the aperture support includes a flange defining a plurality of slots for receiving the ribs and guiding the movement of the aperture support in the direction parallel to the optical axis and preventing rotation of the aperture support.

3. The aperture and lens mechanism claimed in claim 1, wherein ribs are flexible and the ends of the ribs include a snap retention feature for retaining the aperture support on the ribs.

* * * * *